United States Patent
Andou et al.

(10) Patent No.: US 7,131,295 B2
(45) Date of Patent: Nov. 7, 2006

(54) ROLLER ASSEMBLY FOR A GLASS SHEET BENDING APPARATUS AND A GLASS SHEET BENDING APPARATUS

(75) Inventors: Hiroshi Andou, Yokohama (JP); Junji Hori, Aichi (JP)

(73) Assignee: Asahi Glass Company, Limited, Tokyo (JP)

(*) Notice: Subject to any disclaimer, the term of this patent is extended or adjusted under 35 U.S.C. 154(b) by 328 days.

(21) Appl. No.: 10/421,917

(22) Filed: Apr. 24, 2003

(65) Prior Publication Data

US 2004/0007024 A1 Jan. 15, 2004

(30) Foreign Application Priority Data

Apr. 26, 2002 (JP) ............... 2002-125716

(51) Int. Cl.
*C03B 13/16* (2006.01)
*C03B 23/023* (2006.01)

(52) U.S. Cl. .................. 65/370.1; 65/107; 65/287; 65/289; 492/16; 492/40

(58) Field of Classification Search ............ 65/370.1, 65/287–291, 102, 104–107, 253, 273, 289, 65/361; 198/787, 824; 492/7, 16, 40; 193/37; 432/236, 246

See application file for complete search history.

(56) References Cited

U.S. PATENT DOCUMENTS 2,820,541 A * 1/1958 Barnish et al. ............ 198/824
3,023,542 A * 3/1962 Babcock ..................... 65/289
3,088,580 A * 5/1963 Hughes .................... 198/824
4,203,754 A   5/1980 Potier
4,226,608 A * 10/1980 McKelvey ................... 65/106
4,311,509 A   1/1982 Reader et al.
4,787,504 A * 11/1988 Schultz ..................... 198/782
6,397,634 B1  6/2002 Takeda et al.

FOREIGN PATENT DOCUMENTS

| JP | 53-115718 | 10/1978 |
|----|-----------|---------|
| JP | 8-188431  | 7/1996  |
| JP | 10-218629 | 8/1998  |

* cited by examiner

*Primary Examiner*—Eric Hug
(74) *Attorney, Agent, or Firm*—Oblon, Spivak, McClelland, Maier & Neustadt, P.C.

(57) ABSTRACT

A roller assembly for a glass sheet bending apparatus has a guide shaft bent to have a predetermined curvature and a plurality of ring rollers fitted rotatably to the guide shaft whereby a glass sheet is bent while the glass sheet is transferred into a predetermined direction by the rotation of the ring rollers, wherein the guide shaft is formed by overlapping a plurality of strip members bendable to have predetermined curvatures and the ring rollers are rotatably fitted to the guide shaft by means of bearings.

14 Claims, 11 Drawing Sheets

ROLLER ASSEMBLY FOR A GLASS SHEET BENDING APPARATUS AND A GLASS SHEET BENDING APPARATUS

The present invention relates to a roller assembly for a glass sheet bending apparatus and a glass sheet bending apparatus. In particular, it relates to a roller assembly for a glass sheet bending apparatus suitable for transferring a glass sheet heated to a temperature near the softening point to bend it to have a predetermined curvature along a conveying path, and a glass sheet bending apparatus using such roller assembly.

BACKGROUND OF THE INVENTION

As a glass sheet bending apparatus for bending a glass sheet during the transfer of it, a roller-form conveyor is known. The roller-form conveyor is provided with roller assemblies each comprising a guide shaft bent preliminarily to have a predetermined curvature and a plurality of ring rollers attached rotatably to the guide shaft wherein the ring rollers are connected to each other, whereby the roller assemblies can be rotated by a power machine or a power transmitting means disposed at a side of guide shafts. The roller assemblies are arranged in parallel to thereby form a transferring path having a predetermined curvature. When a glass sheet heated to a temperature near the softening point is transferred on the transferring path, the heated glass sheet is bent by its own weight so as to meet the curved surface of the transferring path.

There are many numbers of examples as to structures of roller assemblies.

U.S. Pat. No. 4,311,509 discloses such structure that projections are formed at one side of ring rollers and grooves are formed at the other side of ring rollers wherein a projection formed in a ring roller is fitted to a groove formed in an adjacent ring roller, so that when a rotating force is given to a ring roller at an end, the rotating force is transmitting successively to other rollers whereby all ring rollers can be rotated around the guide shaft holding the ring rollers, as a whole.

U.S. Pat. No. 4,203,754 discloses a roller assembly comprising a flexible bellows type pipe made of stainless steel in which spirally screw-cut portions are formed. A plurality of collars are fastened with spaces to the bellows type pipe by means of the screw-cut portions. Slip pipes are inserted in the collars and are fitted to an outer periphery of a guide shaft. When bellows type pipes are rotated through the slip pipes, a glass sheet is transferred so that it is bent by its own weight along a predetermined curvature formed by the bellows type pipes.

JP-A-8-188431 discloses a roller assembly comprising a guide shaft bent preliminarily to have a predetermined curvature and coil springs fitted rotatably to an outer periphery of the guide shaft. When a rotating force is applied to an end of the coil springs, the coil springs are rotated integrally around the guide shaft.

JP-A-10-218629 discloses a roller assembly of a type that a plurality of ring rollers are fitted to a guide shaft bent preliminarily to have a predetermined curvature; annular ribs are formed at both sides of adjacent ring rollers, and flexible tubular members made of, for example, rubber are fitted to the annular ribs, wherein both ends of the flexible tubular members are connected to the annular ribs by screws so that adjacent ring rollers are connected to each other.

In the above-mentioned structures, however, it was necessary to prepare guide shafts for different kinds of articles having different curvatures because each guide shaft was preliminarily formed to have a predetermined curvature, whereby there was a problem of cost increase. Further, there was a problem that it took a long time for job changing because it was necessary to exchange rollers when a kind of article which has been produced was changed to another to be produced. This caused a reduction in productivity of curved glass sheets.

On the other hand, there is proposed a roller assembly allowing its curvature to have a predetermined value. This roller assembly has such a structure that a guide shaft having a form of coil spring holds thereon a plurality of ring rollers so that the guide shaft can be bent to have a predetermined curvature. This roller assembly uses a thick coil spring. Accordingly, when a glass sheet is bent to have a small radius of curvature R such as a radius of 1,000 mm, which is usable for, for example, a window glass for an automobile, it is difficult to use the roller assembly having a thick coil spring because a smaller radius of curvature is required. Use of a thinner coil spring causes a reduction of the stiffness of the coil spring and is apt to suffer influence by an external force, whereby there is a problem that accuracy in the shape of a bend-shaped glass sheet becomes poor.

SUMMARY OF THE INVENTION

It is an object of the present invention to eliminate the above-mentioned problems and to provide a roller assembly for a glass sheet bending apparatus having a sufficient stiffness and allowing the glass sheet to have a predetermined curvature.

In accordance with a first aspect of the present invention, there is provided a roller assembly for a glass sheet bending apparatus, comprising a guide shaft bent to have a predetermined curvature and a plurality of ring rollers fitted rotatably to the guide shaft whereby a glass sheet is bent while the glass sheet is transferred into a predetermined direction by the rotation of the ring rollers, the roller assembly being characterized in that the guide shaft is formed by overlapping a plurality of strip members bendable to have predetermined curvatures and the ring rollers are rotatably fitted to the guide shaft by means of bearings.

According to a second aspect of the present invention, there is provided the roller assembly as described in the above, wherein adjacent ring rollers in said plurality of ring rollers fitted to the guide shaft are connected to each other and the ring rollers are rotated by a driving force transmitted from a motor.

According to a third aspect of the present invention, there is provided the roller assembly as described in the above-mentioned, wherein adjacent ring rollers in said plurality of ring rollers fitted to the guide shaft are connected to each other by means of flexible tubular members.

In accordance with a fourth aspect of the present invention, there is provided a glass sheet bending apparatus comprising a plurality of roller assemblies arranged with spaces in parallel wherein each of the plurality of roller assemblies is as defined in any of the above-mentioned aspects 1 to 3.

According to a fifth aspect of the present invention, there is provided the glass sheet bending apparatus as described in the fourth aspect, wherein each of the roller assemblies is supported by angle adjusting units provided at its both ends.

According to a sixth aspect of the present invention, there is provided the glass sheet bending apparatus as described in the fourth or fifth aspect, wherein each of the roller assemblies has an end supported by a first supporting portion and the other end supported by a second supporting portion, and a pair of expansion/contraction units disposed at both ends of the roller assembly so as to expand or contract optionally the distance between first and second supporting portions whereby the roller assembly is bent to have a predetermined curvature.

DETAILED DESCRIPTION OF THE PREFERRED EMBODIMENTS

In the following, preferred embodiments of the roller assembly for a glass sheet bending apparatus and the glass sheet bending apparatus according to the present invention will be described with reference to the drawings.

Figure 1:
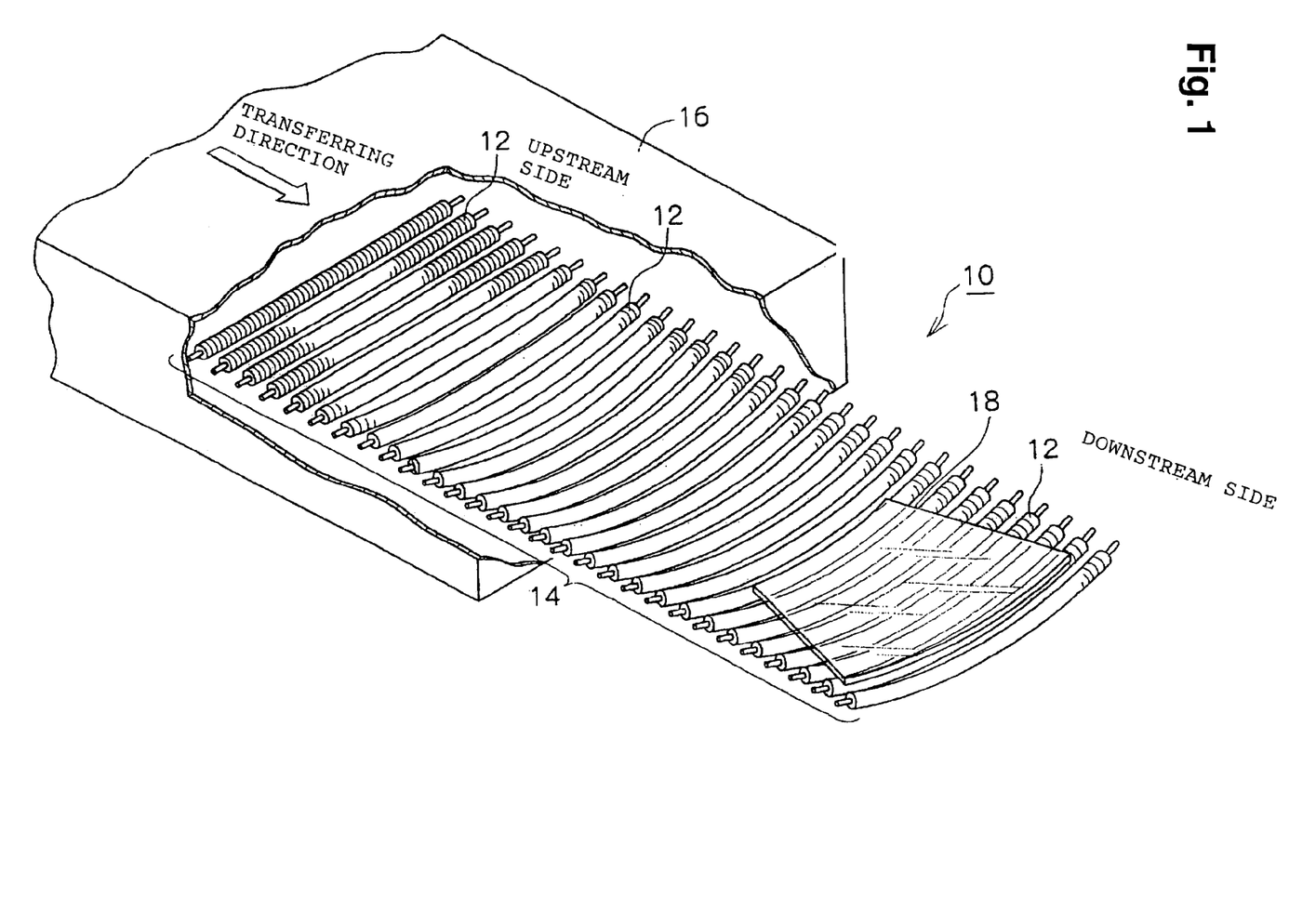
FIG. 1 is a perspective view partly broken showing an embodiment of a glass sheet bending apparatus according to the present invention.

A glass sheet bending apparatus 10 is provided with a plurality of roller assemblies 12, 12, . . . arranged in parallel with each other to form a conveying path, as shown in FIG. 1. The conveying path 14 formed by the roller assemblies, 12, 12, . . . is provided at an end portion of at a downstream side of a heating furnace 16.

Some roller assemblies 12 disposed at an upstream side of the conveying path 14 are formed as straight roller assemblies, and roller assemblies at a downstream side of the conveying path 14 are formed to have predetermined curvatures. Curvatures of the roller assemblies 12 are so determined that the degree of curvature is increased gradually from the upstream side to the downstream side of the conveying path 14 and it has a predetermined curvature at the downstream side of the conveying path 14. Accordingly, a glass sheet 18 heated to a temperature near the softening point in the heating furnace 16 is bent by its own weight to meet the curvature of the conveying path 14 while it is transferred along the conveying path 14.

Figure 2:
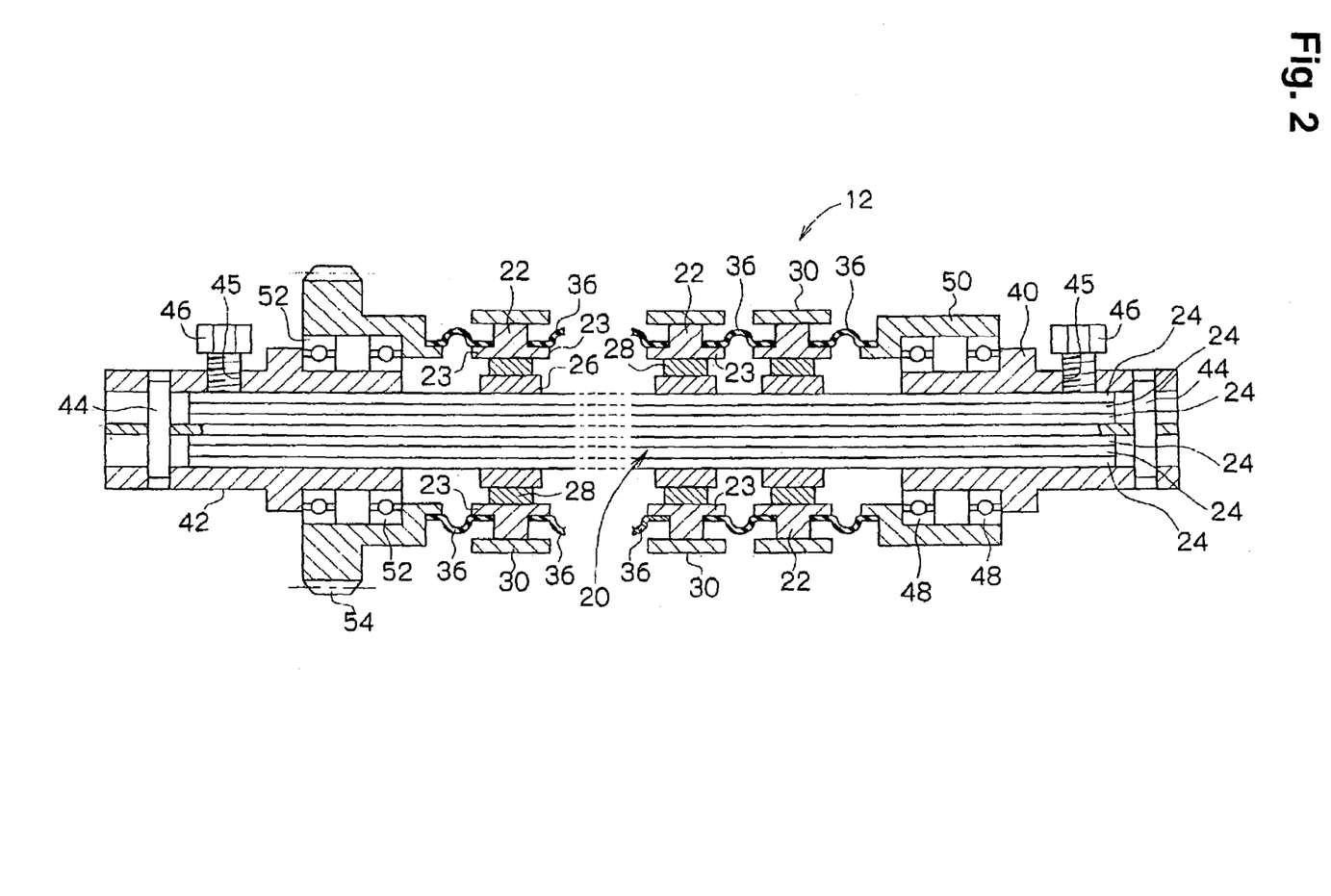
FIG. 2 is a longitudinal cross-sectional view showing an embodiment of a roller assembly for a glass sheet bending apparatus according to the present invention.

As shown in the longitudinal cross-sectional view of FIG. 2, a roller assembly 12 comprises a guide shaft 20 and a plurality of ring rollers 22, 22, . . . fitted rotatably to the guide shaft.

Figure 3:
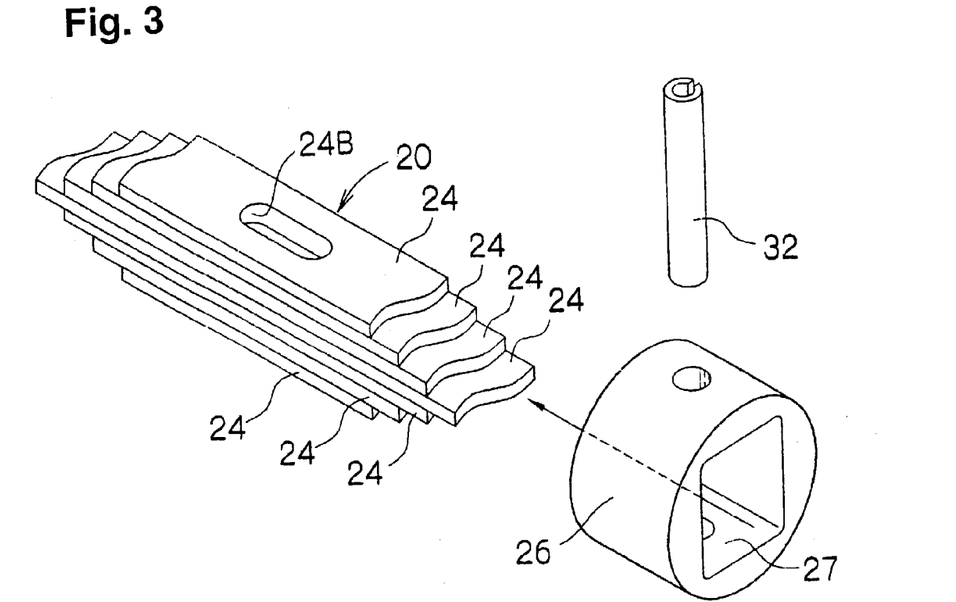
FIG. 3 is an exploded view of a guide shaft partly omitted and a holding member constituting a roller assembly.

The guide shaft 20 is constituted by overlapping seven strip members such as flat bars 24, 24, . . . as shown in FIGS. 2 and 3. Although the number of the strip members 24 are not limited to seven, it is preferable to use them in an odd number by the reason described after. Further, it is preferable that the strip members 24 are made of metal having a sufficient rigidity and being bendable, specifically, they are made of spring steel or stainless steel.

Holding members 26, 26, . . . are fitted to the outer periphery of the guide shaft 20 formed by overlapping the strip members to prevent the guide shaft 20 from being exploded. A holding member 26 has a rectangular opening 27 at its central portion in which the guide shaft 20 is inserted, and an outer peripheral portion of the holding member is formed to have a circular shape. The holding members 26, 26, . . . are arranged on the guide shaft 20 in its longitudinal direction with predetermined intervals. A ring roller 22 is rotatably fitted to the outer peripheral portion of each of the holding members 26 by interposing a slip bearing 28 made of brass having self-slipping properties. Further, a sleeve 30 made of aluminum or a heat-resistant resin is fitted to an outer peripheral portion of the ring roller 20. Further, a heat-resistant member of fabric texture or felt may be attached to the outer surface of the sleeve so as not to damage the glass sheet 18.

Figure 4:
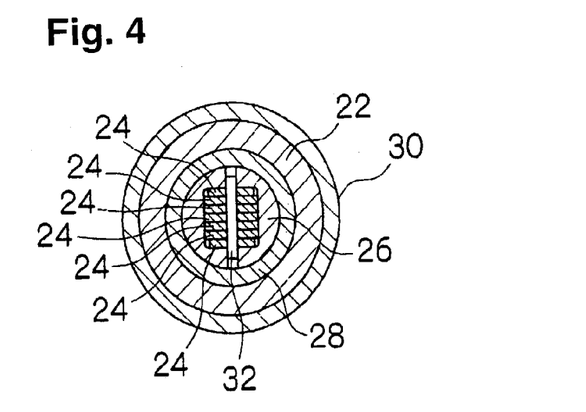
FIG. 4 is a cross-sectional view of a roller assembly.
Figure 5A:
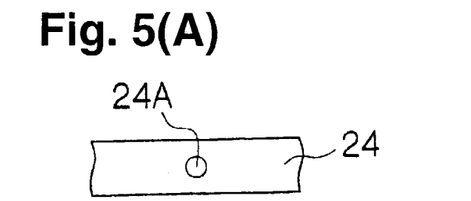
FIGS. 5(A) and 5(B) are plan views of strip members constituting a guide shaft.
Figure 5B:
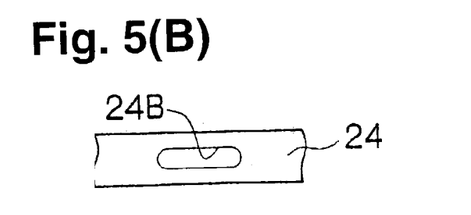
Figure 6:
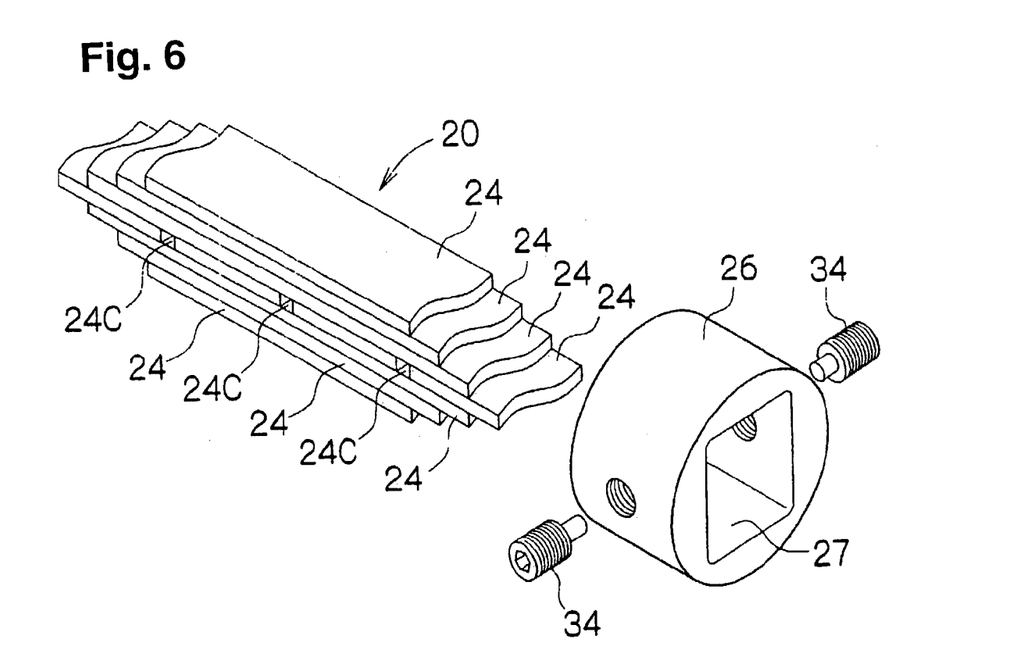
FIG. 6 is an exploded view showing how a guide shaft and a holding member are connected by screw members.
Figure 7A:
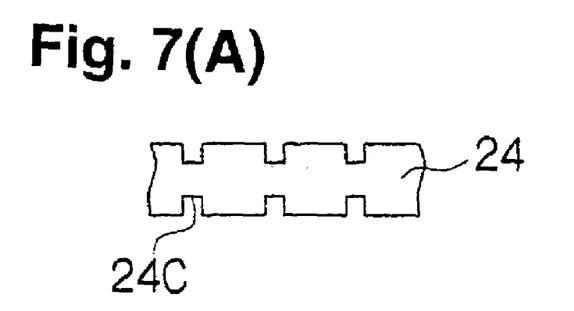
FIGS. 7(A) and 7(B) are plan views of strip members constituting the guide shaft shown in FIG. 6.
Figure 7B:
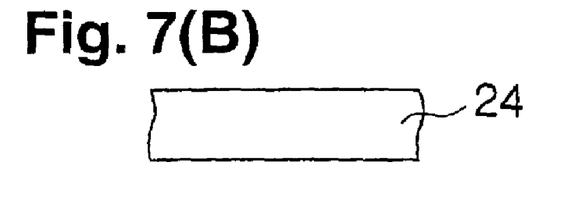

The holding member 26 is fixed to the guide shaft 20 by means of a spring pin 32 shown in FIG. 3 or screw members 34, 34, as shown in FIG. 6. When the guide shaft 20 is curved, there causes slippage between upper and lower surfaces of the overlapped strip members 24, 24, . . . , whereby positions of the strip members deviate. Accordingly, in the case of fixing the holding member 26 by the spring pin 32 as shown in FIGS. 3 and 4, a circular opening 24A allowing the insertion of the spring pin 32 is formed in only the strip member 24 located at the middle (the fourth strip member from the top when seven strip members are used) as shown in FIG. 5(A). For the other strip members 24, elongated openings 24B are formed in their longitudinal directions, as shown in FIG. 5(B), so as to provide a space for slipping the strip members 24 with respect to the spring pin 32. For the same reason, even in the case of fixing the holding member 26 by the screw members 34 as shown in FIG. 6, notched portions allowing the fitting of the screw members 34 are formed at both side surfaces of only the strip member 24 located at the middle, as shown in FIG. 7(A), so that the holding member 26 can be fixed to the guide shaft 20. This is the reason why an odd number of the strip members 24 is desirable. Namely, when an even number of the strip members 24 are used, the strip member 24 to be located the center of the guide shaft 20 does not exist.

Figure 8:
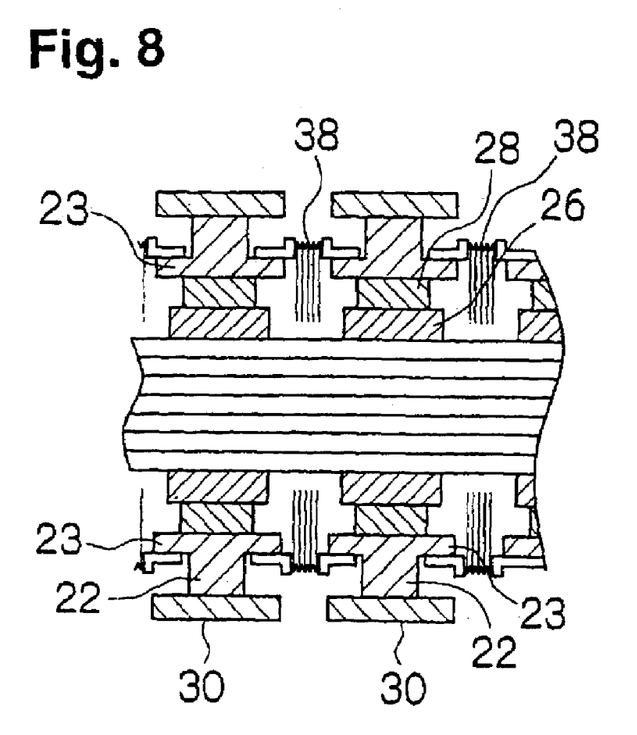
FIG. 8 is a longitudinal cross-sectional view partly omitted showing an example of connecting ring rollers by rubber bellows.
Figure 9:
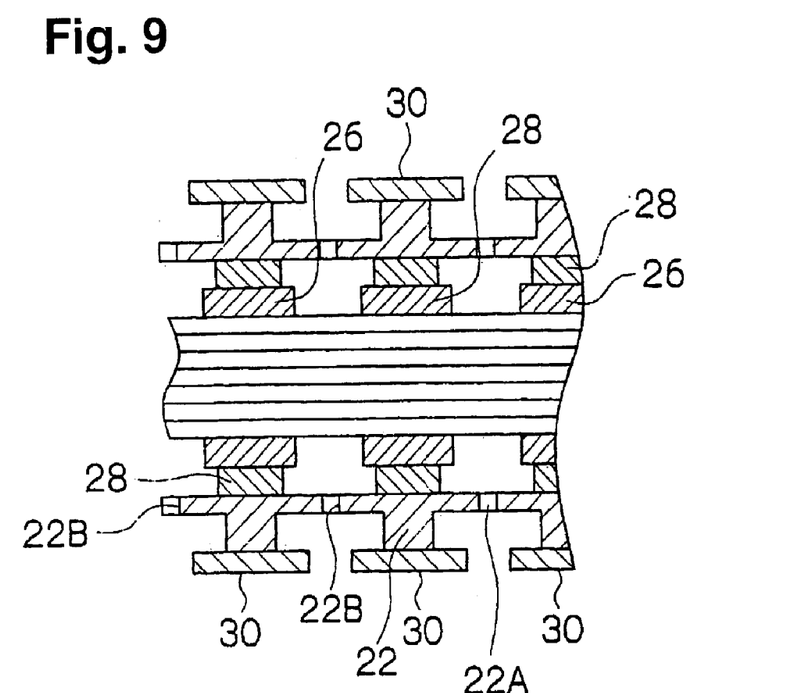
FIG. 9 is a longitudinal cross-sectional view partly omitted showing an example of connecting ring rollers by fitting convex portions to concave portions.
Figure 10:
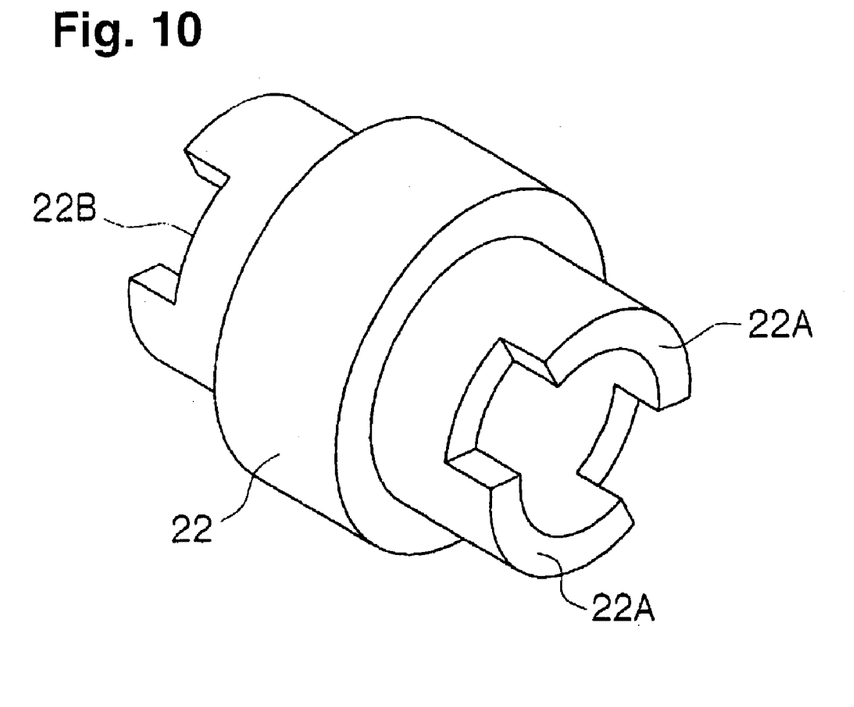
FIG. 10 is a perspective view of the ring roller shown in FIG. 9.

As shown in FIG. 2, adjacent ring rollers 22, 22, . . . are connected by flexible tubular members 36 of heat-resistant rubber attached to annular ribs 23, 23, . . . extending from both sides of the ring rollers 22. A rib 23 and a flexible tubular member 36 are connected by a screw (not shown). Instead of using the flexible tubular member 36, a metallic bellows 38 or a rubber bellows shown in FIG. 8 may be used to connect adjacent ring rollers 22, 22. Further, as shown in FIGS. 9 and 10, ring rollers 22, 22 may be connected by fitting a convex portion 22A formed at a side of a ring roller to a concave portion 22B formed at the opposing side of another ring roller 22.

As shown in FIG. 2, a pair of end sleeves 40, 42 are fitted to both ends of the guide shaft 20. Further, the strip member 24 located at the middle is fixed to the end sleeves 40, 42 by spring pins 44, 44. In addition, a fixing bolt 46 is screwed into a threaded hole 45 formed in a side face of each of the end sleeves 40, 42. After the roller assembly 12 has been bent to have a predetermined curvature, each bolt 46 is fastened to push the guide shaft 20 to the end sleeves 40, 42. Accordingly, the curved guide shaft 20 can be maintained at a determined curvature and the rigidity of the guide shaft 20 can be assured. A pushing force to the guide shaft 20 can be realized by utilizing a hydraulic or pneumatic cylinder or the like, other than a force by fastening bolts.

The end sleeve 40 is attached with a sleeve 50 by interposing bearings 48 and the end sleeve 42 is attached with a gear wheel 54 by interposing bearings 52. The sleeve 50 and the gear wheel 54 are also connected to adjacent ring rollers 22 by means of flexible tubular members 36, 36 respectively.

The gear wheel 54 is meshed with a driving gear wheel (not shown) so that when a rotating force from the driving gear is transmitted to the gear wheel 54, the driving force is transmitted to ring rollers 22 through flexible tubular members 36. Accordingly, all the ring rollers 22, 22, . . . are rotated as a whole. A power transmitting means such as a chain sprocket, a belt pulley, a friction wheel or the like may be used to transmit a rotating force to the ring rollers 22, instead of the gear wheel 54.

The following advantages can be obtained by using the roller assembly 12 having the above-mentioned structure.

Since only the rigidity of the strip members 24, 24, . . . in their thickness direction is considered in order to bend a roller assembly 12 to have a predetermined curvature, it is enough to apply a smaller force to bend the roller assembly 12. Accordingly, the roller assembly can be bent to a smaller radius of curvature R such as a radius of 1,000 mm. In particular, when a stainless steel plate of 2 mm thick is used as the strip members 24, the bending operation to obtain the above-mentioned curvature becomes possible.

On the other hand, a sufficient rigidity can be obtained by fixing the guide shaft 20 to the end sleeves 40, 42 by means of the fixing bolts 46, 46 after the roller assembly 12 has been bent. Since the strip members 24 have originally a strong rigidity in their width direction, the roller assembly 12 being difficult to be influenced by an external force can be presented.

In many roller assemblies according to conventional techniques, the curved shape of guide shafts was fixed. Accordingly, it is impossible to change the curved shape of the roller assemblies after they have once been fabricated. On the other hand, the roller assembly according to the present invention allows a substantial change or a fine adjustment to the curved shape of the roller assembly 12 depending on conditions of operation.

The above-mentioned advantages contribute a cost reduction of tools and jigs used in production, an improvement of productivity because of the shortening of a job-change time in changing articles to be produced and an improvement of working efficiency because a fine adjustment to the shape of the roller assembly is possible.

Figure 11:
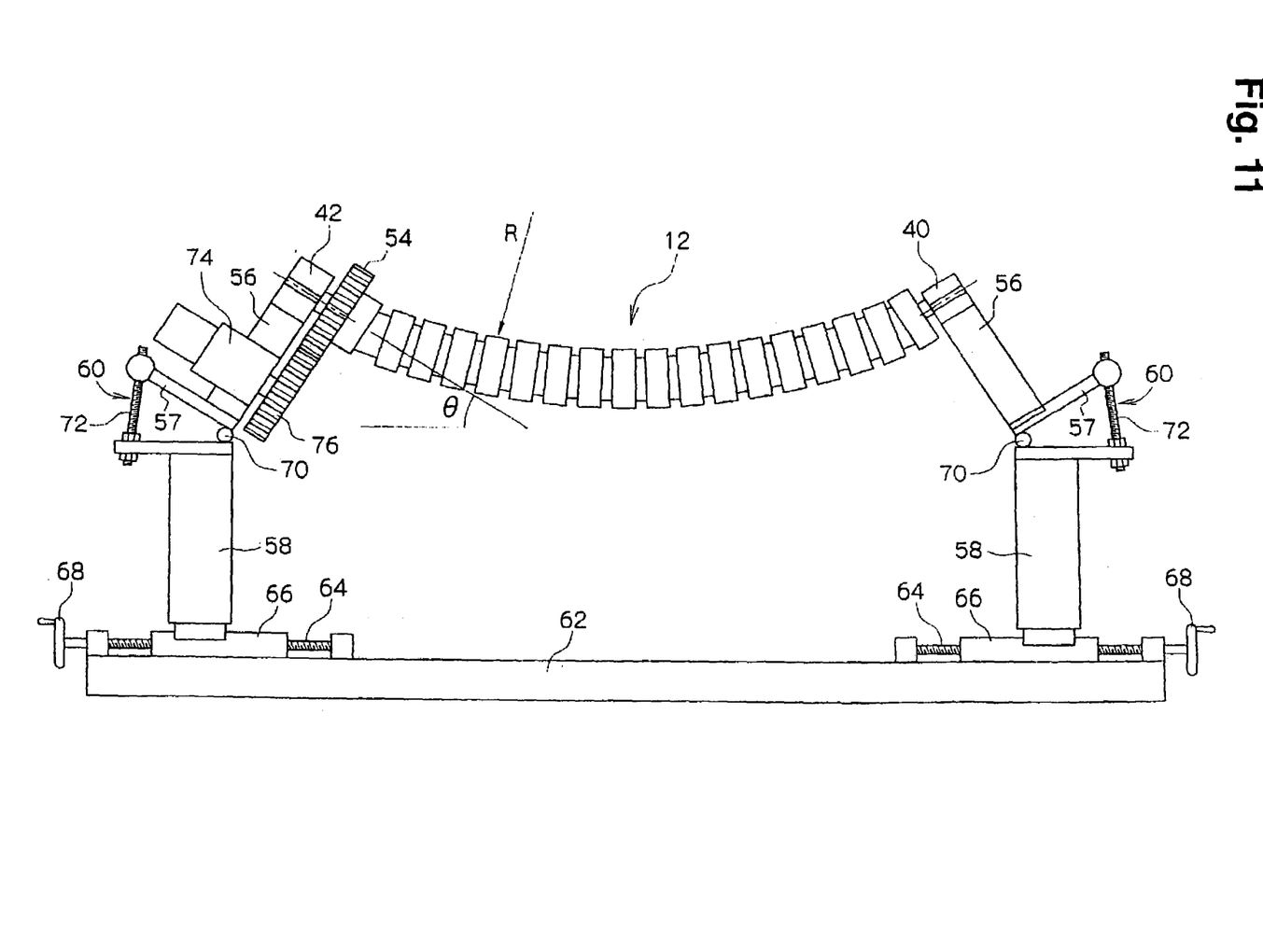
FIG. 11 is a diagram showing how a roller assembly is attached to a bending apparatus.
Figure 12:
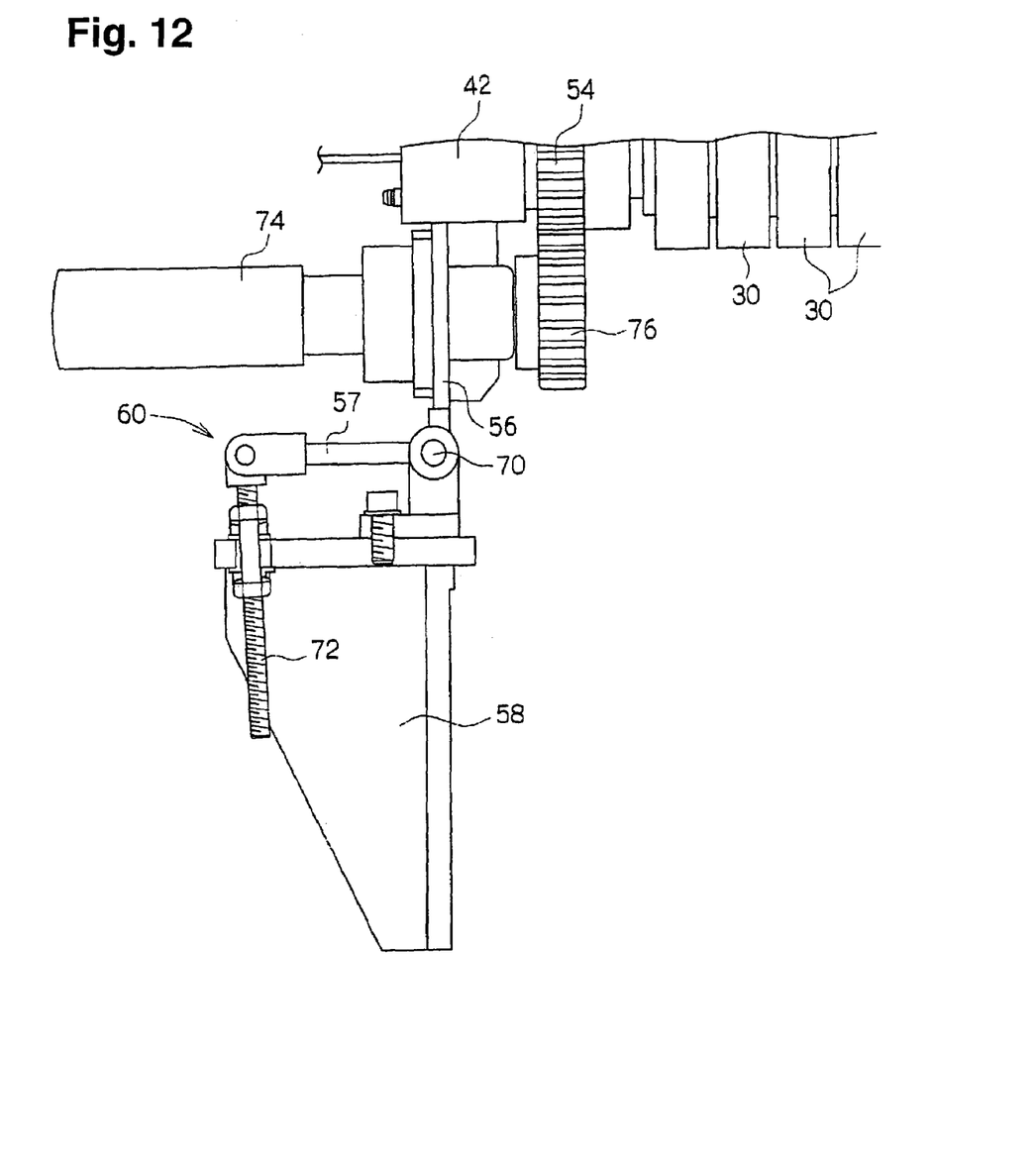
FIG. 12 is a diagram showing an angle adjusting unit.

An installation system to install a roller assembly 12 on a glass sheet bending apparatus 10 is shown in FIG. 11 (a diagram) and FIG. 12 (a detailed view of a part thereof). As the structure for bending roller assembly 12 to have a predetermined curvature, it is necessary that supporting positions (by which the width of support can be determined) at both ends of the roller assembly 12 and angles of attachment can be determined optionally. Further, it is necessary to keep the posture of the assembly after the determination.

In the installation system shown in FIGS. 11 and 12, the end sleeves 40, 42 at both end portions of the roller assembly 12 are supported by inclinable posts (corresponding to the supporting portions described in the Claims) 56, 56, and these inclinable posts 56, 56 are supported by angle adjusting units 60, 60 so that they can be inclined while an opposing state is maintained. Columns 58, 58 are fixed respectively to sliders 66, 66 which are engaged with lead screws (corresponding to the expansion/contraction units described in the Claims) 64, 64 which are supported by a base plate 62 so that the columns 58, 58 can be moved in a direction approaching each other or separating from each other by means of a directional guide members (not shown). The distance between the columns 58, 58 can be adjusted by operating manual operation handles 68 connected to the lead screws 64 to move the columns 58, 58. When the columns 58 are moved in a direction of narrowing the distance, the roller assembly 12 is curved downward to increase the curvature (i.e. the radius of curvature becomes small). A motor may be used to drive the lead screws 64.

Each angle adjusting unit 60 is to determine an angle of inclination with respect to a horizontal line at an end portion of the roller assembly 12. The angle adjusting unit 60 shown in FIGS. 11 and 12 is so constructed that the inclinable post 56 is supported by the column 58 by means of a hinge 70 so as to be inclined, and an arm 57 attached to the inclinable post 56 by means of the hinge 70 is connected to the column 58 by means of a lead screw 72. Accordingly, when the lead screw 72 is operated in a fastening direction, the angle of inclination of the inclinable post 56 becomes large whereby the angle of inclination θ at an end of the roller assembly 12 becomes large. On the other hand, when the lead screw 72 is operated in a loosening direction, the angle of inclination of the inclinable post 56 becomes small whereby the angle of inclination at the end of the roller assembly 12 becomes small. Then, a pair of nuts 73, 73 fitted to the lead screw 72 are fastened to fix the lead screw 72 at the press. Accordingly, the roller assembly 12 can be fixed at the set angle θ. The angle of inclination θ is determined so as to correspond the distance between the columns 58, 58. Namely, the angle of inclination θ becomes larger as the distance is narrowed, and the angle of inclination θ becomes smaller as the distance is increased. Accordingly, the roller assembly 12 can be bent without applying an excessive force to the roller assembly 12.

Figure 13:
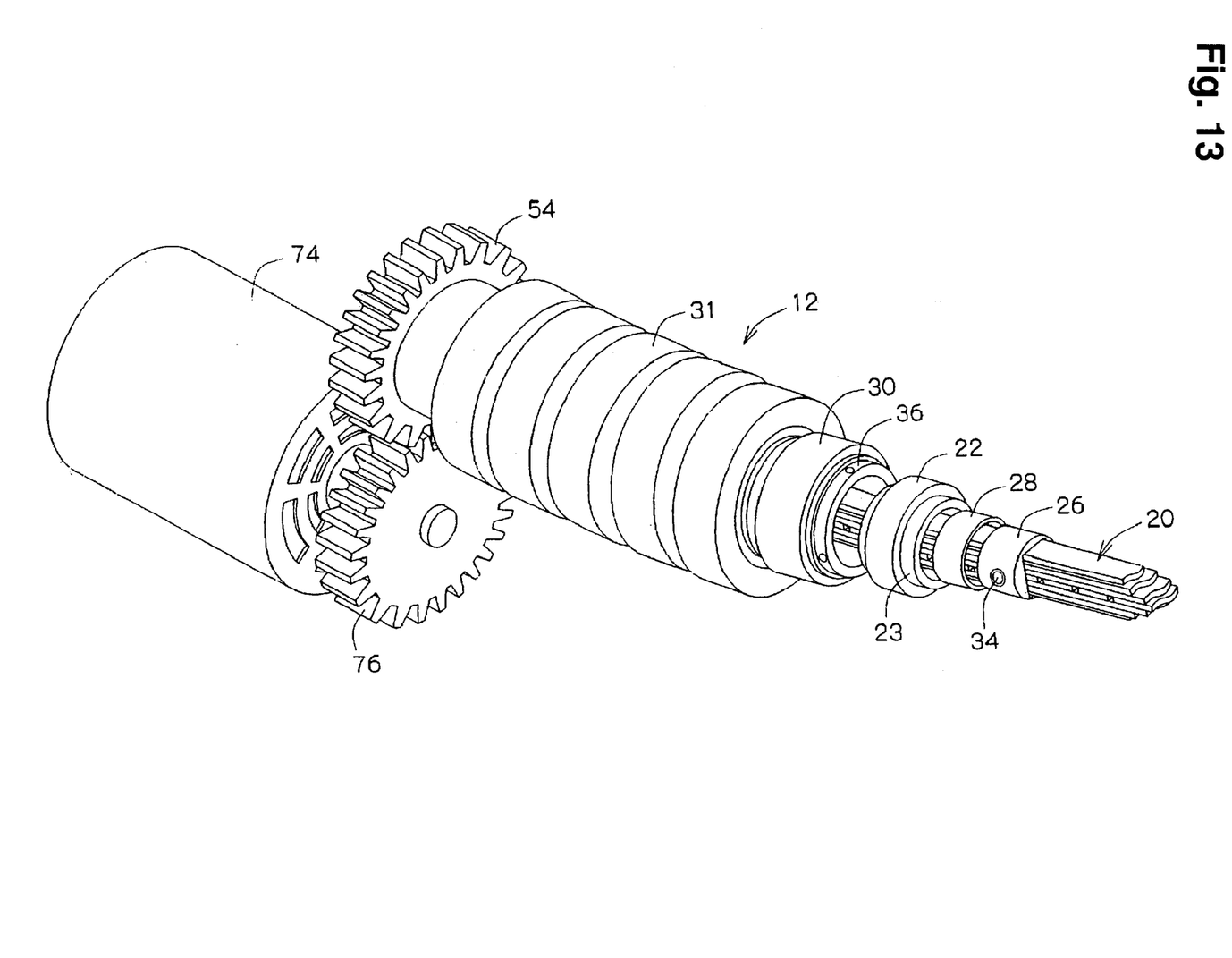
FIG. 13 is a perspective view partly broken of a roller assembly.

In the structure shown in FIGS. 11 and 12, sufficient rigidity for practical use can be assured by fixing supporting positions (the width of support) at both ends of the roller assembly 12 and the angle of inclination, without the necessity of fixing the guide shaft 20 to the end sleeves 40, 42 by a pushing force of the fixing bolts 46 (see FIG. 2). Of course, the fixing by using the fixing bolts 46 to push the guide shaft 20 may be used together with the fixing by the above-mentioned structure. In FIG. 11, a motor 74 is fixed to the inclinable post 56 located at a left side in the drawing, and the driving gear 76 of the motor 74 is meshed with the gear wheel 54 attached to the roller assembly 12 as show in FIG. 13. Reference numeral 31 in FIG. 13 designates a heat-resistant member a textile material or felt attached to an outer surface of the sleeve 30.

Figure 14:
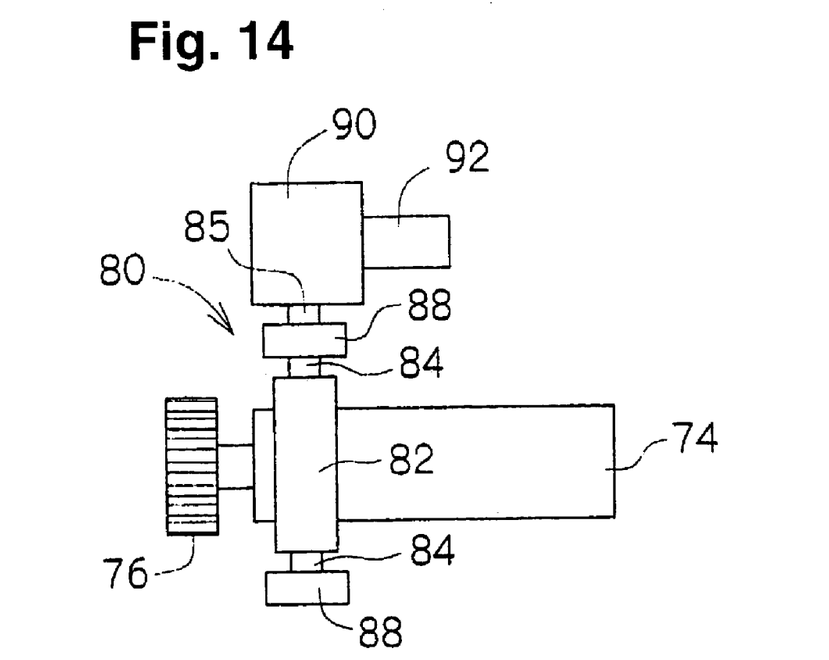
FIG. 14 is a plan view showing another embodiment of the angle adjusting unit.
Figure 15:
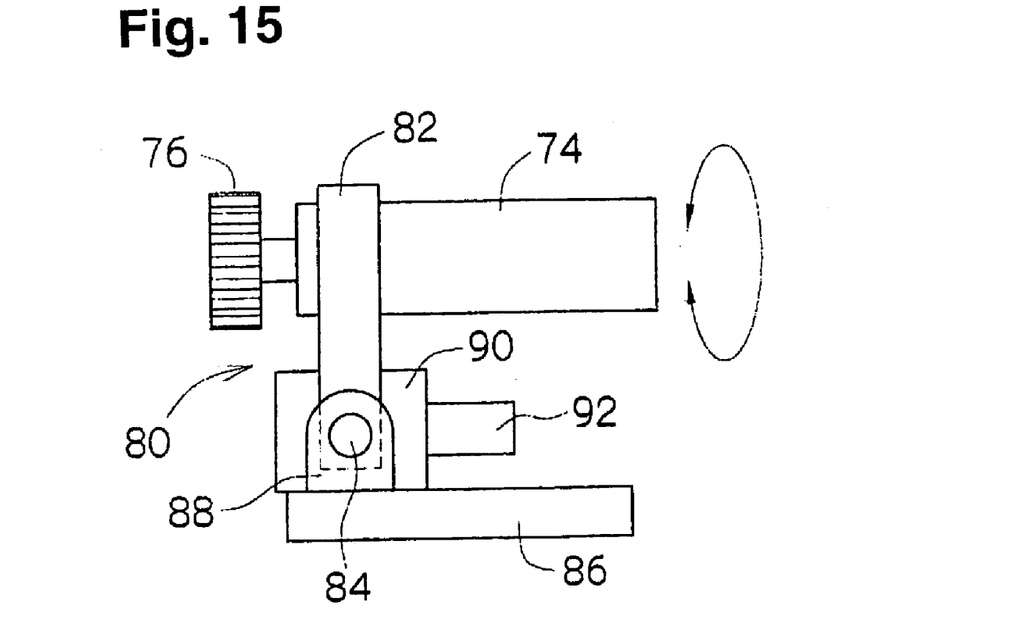
FIG. 15 is a side view of the angle adjusting unit shown in FIG. 14.

The angle adjusting unit is not limited to that shown in FIG. 12 but may be an angle adjusting unit 80 as shown in FIGS. 14 and 15, for example. The angle adjusting unit 80 is so constructed that a swing shaft 84 is fixed to a bracket 82 attached to a motor 74; the swing shaft 84 is supported rotatably by bearings 88, 88 mounted on a base plate 84, and an end portion 85 of the swing shaft 84 supported rotatably by the bearings 88 is connected to the output shaft of a motor 92 through a gear box 90 with a worm gear. Accordingly, when the motor 92 is rotated, a rotating force is transmitted to the swing shaft 84 while the rotating force is decelerated by the gear box 90, and the motor 74 is swung around the swing shaft 84. Accordingly, the roller assembly 12 meshed with the driving gear 76 of the motor 74 is swung according to a swing motor of the motor 74 whereby the angle of inclination θ can be determined (FIG. 11).

In the roller assembly 12 having the above-mentioned structure, the guide shaft 20 of the roller assembly 12 is formed by overlapping a plurality of strip members 24, 24, . . . each being bendable to have a predetermined curvature. Accordingly, the roller assembly 12 can be bent to have a predetermined curvature while a sufficient rigidity is maintained, in comparison with a conventional roller assembly having a coil-spring guide shaft.

Further, in the roller assembly 12 of the present invention, adjacent ring rollers 22, 22 on the guide shaft 20 are connected to each other, and they are rotated around the guide shaft 20 by transmitting power from the motor 74. Accordingly, the roller assembly 12 having a driving force to transfer a glass sheet 18 can be presented.

Further, according to the roller assembly 12, adjacent ring rollers 22, 22 on the guide shaft 20 are connected to each other by means of flexible tubular members 36. Accordingly, the curvature of a curved line connecting ring rollers 22, 22, . . . , which is formed by an elastic deformation in a bending direction of the flexible tubular members 36, can easily be determined to a desired curvature. Further, since each flexible tubular member 36 is in a tubular form and has resistance against a twisting force, and therefore, power from the motor 74 can certainly be transmitted to adjacent ring rollers.

The application of the roller assembly 12 having the above-mentioned effect to the glass sheet bending apparatus 10 as shown in FIG. 1 dispenses with operations for exchanging rollers which are required in changing articles to be produced. Accordingly, a time for job-changing work can substantially be eliminated.

Further, in the glass sheet bending apparatus 10, both end portions of the roller assembly 12 are supported by the inclinable posts 56, 56, and the radius R of the roller assembly 12 can be determined optionally by expanding or contracting the distance between the inclinable posts by the lead screws 64. Therefore, a simple structure for bending the roller assembly 12 to have a predetermined value can be provided.

With respect to the embodiment shown in FIG. 1, explanation has been made as to an example that the roller assembly 12 is applied to the bending apparatus 10 for bending a glass sheet 18 by its own weight. However, the roller assembly 12 is not limited to such application. For example, the roller assembly 12 may be applied to the glass sheet bending apparatus described in U.S. Pat. No. 6,397,634. This bending apparatus is adapted to move vertically rollers, which support a glass sheet 18 in transferring the glass sheet 18, to bend it to have a predetermined curvature in a transferring direction. When the roller assembly 12 is applied to this apparatus, it can be realized to bend a glass sheet in a direction perpendicular to the transferring direction.

Figure 16:
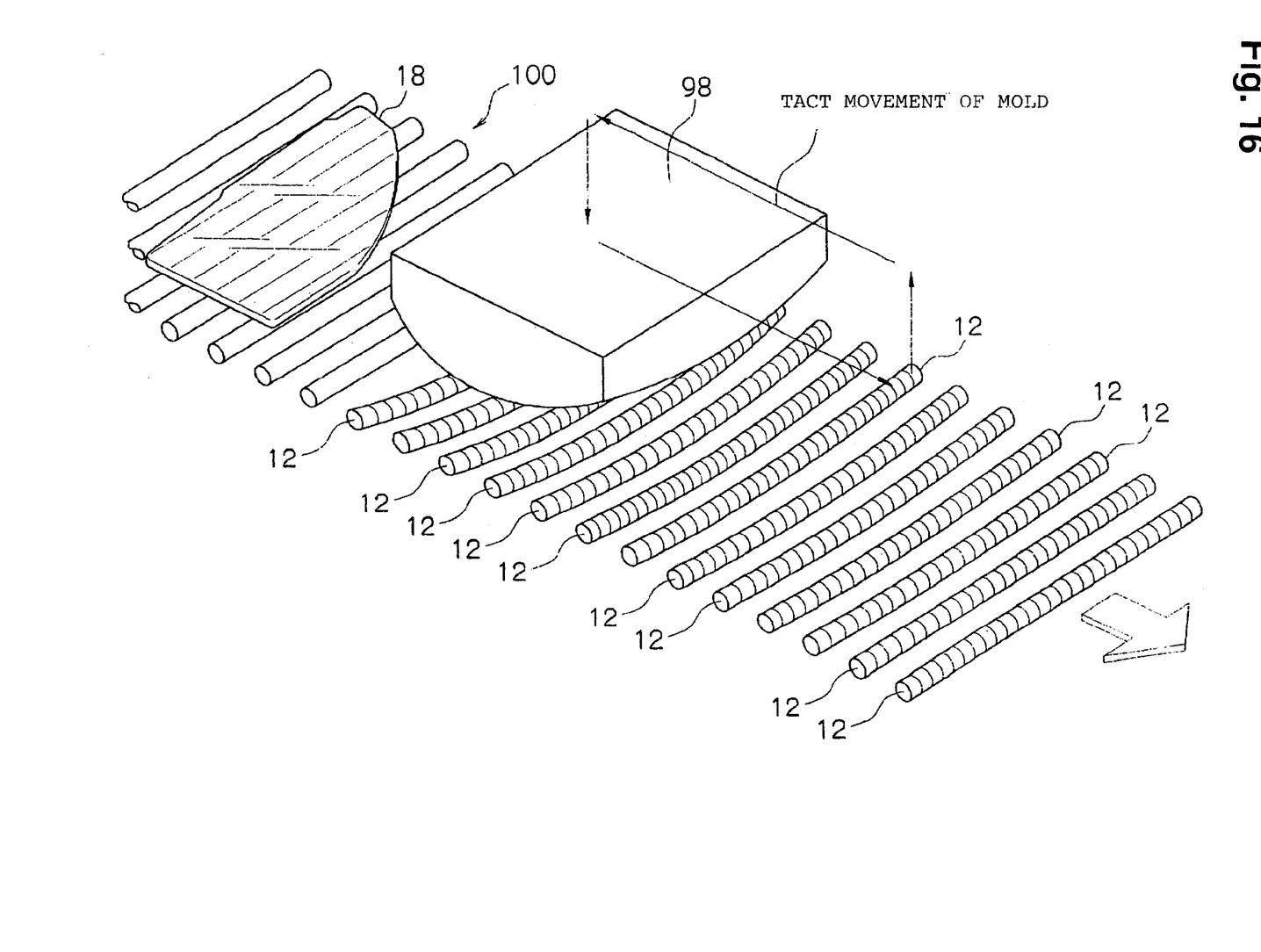
FIG. 16 is a diagram showing an example that roller assemblies are applied to a mold type bending apparatus.

Further, the present invention can be applied to a bend-shaping apparatus 100 as shown in FIG. 16 in which a glass sheet 18 is forcibly bent by a pressing force of a mold 98 while the glass sheet 18 is transferred on roller assemblies 12, 12, . . . . The roller assemblies 12, 12, . . . are moved vertically as the glass sheet 18 is transferred so that a transferring plane formed by the roller assemblies 12, 12, . . . creates undulation as if a wave propagates from an upper stream to a downstream. When the glass sheet 18 is transferred on the transferring plane, the glass sheet 18 is bent by its own weight.

The mold 98 is moved in the transferring direction in synchronism with a transferring speed of the glass sheet 18, and is descended to press the glass sheet 18 to roller assemblies 12, 12, . . . to have predetermined curvatures. Further, the mold 98 is moved in the same direction as the glass sheet 18 and the same speed as the transferring speed of the glass sheet while the mold 98 keeps a state of pressing to the glass sheet. Then, the mold 98 is ascended from the glass sheet to be returned to the original position for starting the compression. Namely, the mold 98 performs a tact movement in the directions shown by arrow marks in FIG. 6 to bend successively transferred glass sheets 18.

As described above, according to the present invention, the guide shaft of the roller assembly is constituted by overlapping a plurality of strip members each being bendable to have a predetermined curvature. Accordingly, the roller assembly can be curved to have a predetermined curvature, keeping a sufficient rigidity.

Further, according to the present invention, adjacent ring rollers fitted on the guide shaft are connected to each other, and they are rotated around the guide shaft by a rotating force by transmitting power from a motor. Accordingly, the roller assembly having a sufficient driving force to transfer glass sheets can be presented.

Further, according to the present invention, ring rollers attached to the guide shaft are connected by flexible tubular members. Accordingly, the curvature of a curved line formed by connecting ring rollers, which is caused by elastic deformation in the direction of bending the elastic tubular members, can easily be set to a predetermined curvature. Further, since each flexible tubular member has a tubular form and has resistance against a twisting force, power from the motor can certainly be transmitted to adjacent ring rollers.

According to the glass sheet bending apparatus of the present invention in which the roller assembly of the present invention is applied. Accordingly, a roller exchanging work which was required at the time of exchanging articles to be produced is unnecessary, and therefore, a time for job-changing can substantially be eliminated.

Further, according to the glass sheet bending apparatus of the present invention, both end portions of the roller assembly are supported by supporting portions and the distance between the supporting portions can optionally be expanded or contracted by expansion/contraction units whereby the roller assembly can be bent to have a predetermined curvature. Accordingly, a simple structure for setting the curvature of the roller assembly can be presented.

The entire disclosure of Japanese Patent Application No. 2002-125716 filed on Apr. 26, 2002 including specification, claims, drawings and summary is incorporated herein by reference in its entirety.

What is claimed is:

1. A roller assembly for a glass sheet bending apparatus, comprising a guide shaft bent to have a predetermined curvature and a plurality of ring rollers fitted rotatably to the guide shaft whereby a glass sheet is bent while the glass sheet is transferred into a predetermined direction by rotation of the ring rollers, said guide shaft comprising a plurality of strip members, each of said strip members comprising a bendable strip member so as to be adjusted to a predetermined curvature wherein the ring rollers are rotatably fitted to the guide shaft by means of bearings.

2. The roller assembly for a glass sheet bending apparatus according to claim 1, wherein adjacent ring rollers in said plurality of ring rollers fitted to the guide shaft are connected to each other and the ring rollers are rotated by a driving force transmitted from a motor.

3. The roller assembly for a glass sheet bending apparatus according to claim 1,
wherein adjacent ring rollers in said plurality of ring rollers fitted to the guide shaft are connected to each other by means of flexible tubular members.

4. The roller assembly for a glass sheet bending apparatus according to claim 1, wherein each of the ring rollers is provided with a holding member fitted to a guide shaft and a sleeve fitted to the ring roller.

5. The roller assembly for a glass sheet bending apparatus according to claim 1, wherein the holding member is fixed to the guide shaft by a pin which is penetrated into a strip member.

6. The roller assembly for a glass sheet bending apparatus according to claim 4, wherein the holding member is fixed to the guide shaft by a screw member which is engaged with a notched portion formed in an edge portion of a strip member.

7. A glass sheet bending apparatus comprising a plurality of roller assemblies arranged with spaces in parallel wherein each of the plurality of roller assemblies is such one as defined in claim 1.

8. The glass sheet bending apparatus according to claim 7, wherein each of the roller assemblies is supported by angle adjusting units provided at its both ends.

9. The glass sheet bending apparatus according to claim 7, wherein each of the roller assemblies has an end supported by a first supporting portion and the other end supported by a second supporting portion, and a pair of expansion/contraction units disposed at both ends of the roller assembly so as to expand or contract optionally the distance between first and second supporting portions whereby the roller assembly is bent to have a predetermined curvature.

10. The glass sheet bending apparatus according to claim 7, wherein the roller assemblies are moved vertically as a glass sheet is transferred.

11. The glass sheet bending apparatus according to claim 10, wherein a movable mold is provided to push the transferred glass sheet to the roller assemblies.

12. The glass sheet bending apparatus according to claim 7, wherein the glass sheet is used for a window glass of an automobile.

13. The roller assembly for a glass sheet bending apparatus according to claim 1, wherein said strip members are slidable with respect to one another.

14. The roller assembly for a glass sheet bending apparatus according to claim 1, wherein said plurality of strip members comprise an odd number of strip members.

* * * * *